United States Patent [19]
Mo et al.

[11] Patent Number: 6,142,943
[45] Date of Patent: Nov. 7, 2000

[54] DOPPLER ULTRASOUND AUTOMATIC SPECTRUM OPTIMIZATION

[75] Inventors: Larry Y. L. Mo, Waukesha; Michael J. Washburn, New Berlin; Lihong Pan, Brookfield; Susan M. B. Barnhart, Delafield, all of Wis.

[73] Assignee: General Electric Company, Milwaukee, Wis.

[21] Appl. No.: 09/223,357

[22] Filed: Dec. 30, 1998

[51] Int. Cl.$^7$ ............................................ A61B 8/00
[52] U.S. Cl. ..................... 600/447; 600/443; 600/441; 382/128
[58] Field of Search ................................. 600/437, 447, 600/443, 448, 441, 449, 444; 382/128

[56] References Cited

U.S. PATENT DOCUMENTS

| | | | |
|---|---|---|---|
| 5,594,807 | 1/1997 | Liu ........................................... | 382/128 |
| 5,735,797 | 4/1998 | Muzilla et al. ......................... | 600/441 |
| 5,993,392 | 11/1999 | Roundhill et al. ...................... | 600/447 |

*Primary Examiner*—Marvin M. Lateef
*Assistant Examiner*—Maulin Patel
*Attorney, Agent, or Firm*—McAndrews Held & Malloy; Christian G. Cabou; Phyllis Y. Price

[57] ABSTRACT

A Doppler unit generates a Doppler signal from ultrasound backscattered signals. A logic unit performs a Fourier transform and compresses the resulting signals according to a compression curve determined in part by the noise level in the system. The peak values of the compressed signals also may be used to adjust the video gray mapping of the compressed signals in order to improve the appearance of a Doppler image on a display.

34 Claims, 4 Drawing Sheets

DOPPLER ULTRASOUND AUTOMATIC SPECTRUM OPTIMIZATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to ultrasonic diagnostic systems which measure the velocity of blood flow using spectral Doppler techniques. In particular, the invention relates to the optimal presentation of such information in a continuous time-line display.

Ultrasonic scanners for detecting blood flow based on the Doppler effect are well known. Such systems operate by actuating an ultrasonic transducer array to transmit ultrasonic waves into the object and receiving ultrasonic echoes backscattered from the object. In the measurement of blood flow characteristics, returning ultrasonic waves are compared to a frequency reference to determine the frequency shift imparted to the returning waves by flowing scatterers, such as blood cells. This frequency shift translates into the velocity of the blood flow.

In state-of-the-art ultrasonic scanners, the pulsed or continuous wave (CW) Doppler waveform is computed and displayed by a video processor in real-time as a gray-scale spectrogram of velocity versus time with the gray-scale intensity (or color) modulated by the spectral power. The data for each spectral line comprises a multiplicity of frequency data bins for different frequency intervals, the spectral power data in each bin for a respective spectral line being displayed in a respective pixel of a respective column of pixels on the display monitor. Each spectral line represents an instantaneous measurement of blood flow.

Two factors which affect the display contrast resolution of the Doppler spectrogram are the data compression dynamic range (DR) and the video processor's gray map. Both of these factors typically are user-adjustable via front panel control keys. A logarithmic function is usually used to compress the FFT spectra resulting from ultrasound echo signals so they can be displayed on a video monitor which typically has a gray scale resolution limited to 6–8 bits or 64 to 256 gray levels. FIG. 2A illustrates some typical display DR settings for log compression. The compressed data (y) is further transformed to gray levels (z) via a gray map (FIG. 2B). A computer host typically specifies which compression function (FIG. 2A) and gray map are to be used based on a user's input via front-panel control keys. In practice, as shown in FIG. 2A, the y versus 10log(x) compression map is often pivoted at some intermediate y value in an attempt to keep the typical signal level at a constant video intensity for the different dynamic range settings. This means that for very small or very large gain settings, the probability density distribution may saturate at the low or high end of the dynamic range (typically 20–40 dB).

For best visualization and analysis (waveform tracing) of the spectrogram, the display DR (FIG. 2A) should be chosen based on the spectral signal DR (range of spectral amplitudes). In practice, however, the latter is not readily available to the user, and DR and gray map adjustments are seldom made. Instead, the pre-set DR and gray map for a given application type is used. The shortcoming of the preset approach is that for the same application type, the Doppler signal DR may vary by more than 10 dB between different vessels or different subjects. Any manual DR adjustment based on visual judgment is subjective and often requires a corresponding system gain change because the mean signal level may not be at the pivot point (FIG. 2A) of the compression curves.

Some form of automatic gain control may be used to ensure that the spectral noise floor stays constant as a function of depth, and/or to turn down the system gain automatically if saturation is detected. However, it should be noted that such gain control does not address what DR and gray map should be used in order to display the spectrogram with optimal perceived contrast.

BRIEF SUMMARY OF THE INVENTION

The preferred embodiment of the invention includes an apparatus and a method useful in an ultrasound system comprising a display unit connected to display a Doppler image. The appearance of the image is enhanced by generating a Doppler signal based on an ultrasound signal backscattered from a patient, preferably by using a Doppler unit. First signals having first values representing the magnitudes of at least some of the component frequencies of the Doppler signal are generated, preferably by means of a logic unit such as a digital signal processor. A second signal having a second value related to the video noise signal level present in the display unit is generated, preferably by a logic unit such as a digital signal processor. Third signals having third values altered from the first values according to a predetermined curve adjusted in accordance with the second value are stored, preferably in a digital memory, for defining the dynamic range of the third values. The Doppler image is displayed responsive at least in part to the third signals so that the Doppler image is enhanced. The display preferably is accomplished by a display processor.

According to another embodiment of the invention, a display unit having a plurality of brightness levels for displaying a Doppler image is utilized. A Doppler signal based on an ultrasound signal backscattered from a patient is generated, preferably by means of a Doppler unit. First signals having first values representing the magnitudes of at least some of the component frequencies of the Doppler signal are generated, preferably by a logic unit, such as a digital signal processor. Second signals having second values altered from the first values according to a predetermined curve defining the dynamic range of the second values are stored, preferably in a digital memory. A third signal having a third value related to one or more of the peak second values is generated, preferably by a logic unit, such as a digital signal processor. Fourth signals having fourth values altered from the second values based at least in part on the third value are stored and define the gray scale of the Doppler display. A Doppler image responsive at least in part to the fourth signals is displayed so that the Doppler image is enhanced. The display preferably is accomplished with a display processor.

The foregoing embodiments may be combined to provide an additional enhancement of a Doppler image.

By using the foregoing methods and apparatus, the dynamic range setting and/or gray map of the ultrasound system is automatically adjusted to optimize the display contrast of the Doppler image, thereby aiding the reading and interpretation of the Doppler image. Due to the dynamic range optimization, auto waveform tracing performance also is improved, especially if the signal to noise ratio is poor.

DETAILED DESCRIPTION OF THE INVENTION

Figure 1:
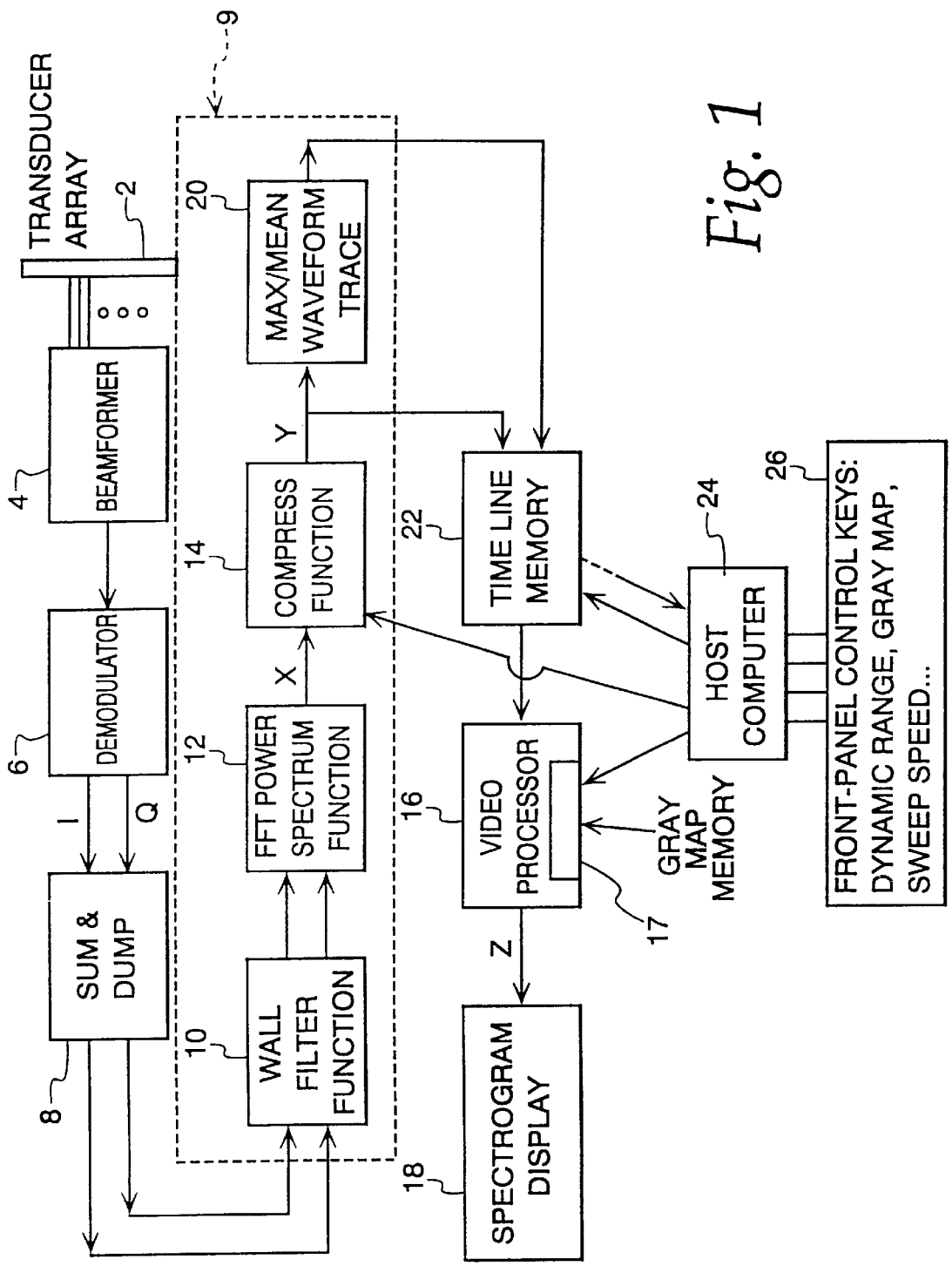
FIG. 1 is a block diagram showing the signal processing chain for a preferred spectral Doppler mode of an ultrasound imaging system made in accordance with the invention. I and Q denote the in-phase and quadrature components of the demodulated signal, respectively.

Referring to FIG. 1, an ultrasound transducer array 2 is activated to transmit ultrasound bursts which are fired repeatedly at a pulse repetition frequency (PRF) so that ultrasound is backscattered from a predetermined portion or volume of a patient or subject of study. Alternatively, the array 2 may be continuously energized. The PRF is typically in the kilohertz range. The return RF signals are detected by the transducer elements and then formed into a receive beam by a beamformer 4. For a digital system, the summed RF signal from each firing is demodulated by a demodulator 6 into its in-phase and quadrature (I/Q) components. The I/Q components are integrated (summed) over a specific time interval and then sampled by block 8. The summing interval and transmit burst length together define the length of the sample volume as specified by the user. The "sum and dump" operation effectively yields the Doppler signal corresponding to the ultrasound signal backscattered from the sample volume in the patient.

The Doppler signal is transmitted to a midprocessor 9 which includes a logic unit, such as a digital signal processor (DSP) not shown. Alternatively, a microprocessor, microsequencer or microcontroller may be employed. Hardwired logic units also can be utilized to perform the operations described in connection with the DSP.

The Doppler signal is assessed by the DSP through a digital wall filter function 10 which rejects any clutter in the signal corresponding to stationary or very slow moving tissue. The filtered signals are used by the DSP to perform an FFT power spectrum function or algorithm 12 which typically takes Fast Fourier Transforms (FFT's) over a moving time window of 64 to 128 samples. Function 12 generates frequency signals having values representing the magnitudes of at least some of the Doppler component frequencies represented by the output of wall filter function 10.

Each FFT power spectrum is compressed by the DSP in a compression function 14 and the resulting signals are stored in a time line memory 22. The signals from memory 22 are mapped by a video processor 16 to a gray scale map for display on monitor 18 as a single spectral line at a particular time point in the Doppler velocity (frequency) versus time spectrogram. The data for the spectral line is stored in a time line memory 22. The gray scale map is stored in a memory 17 within the video processor 16.

Doppler waveform tracing is performed by processing block 20 after the FFT power spectrum X is compressed in accordance with a compression function h(x)=y.

The preferred embodiment of the present invention uses a precise model of the probability distribution of X to establish a threshold as a reference for data compression and gray scale mapping. It is well established (see Mo et al., "'Speckle' in continuous wave Doppler ultrasound spectra: a simulation study," IEEE Trans. Ultrason., Ferroelec. & Freq. Control, UFFC-33, pp. 747–753 (1986)) that the spectral power of any zero-mean Gaussian signal (including white noise) is governed by the exponential probability density distribution:

$$F_x(x) = \frac{1}{m} e^{-x/m}, x \geq 0 \quad (1)$$

where the mean and standard deviation of x are given by:

$$E[x]=m; \sigma=m \quad (2)$$

Figure 3:
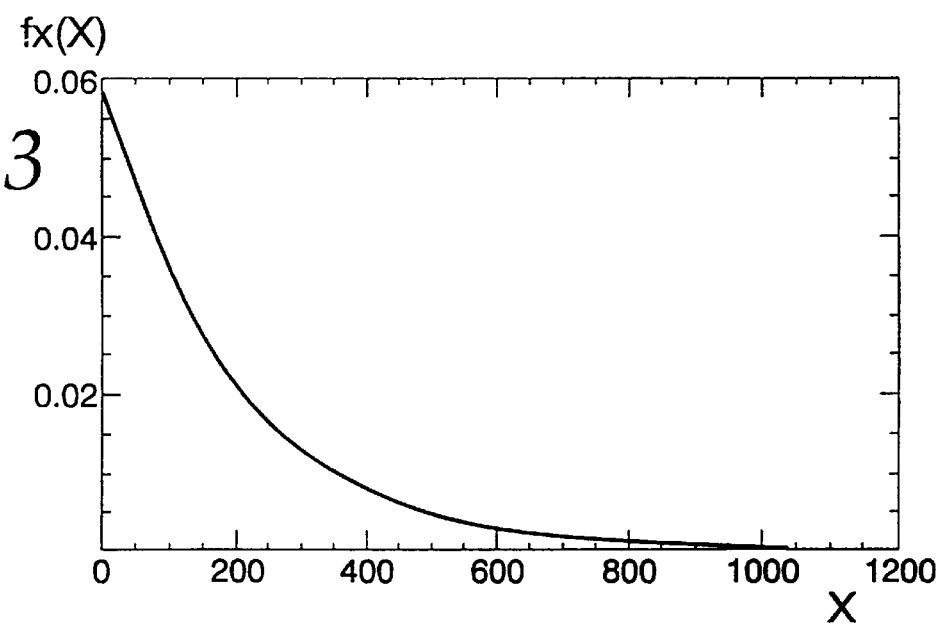
FIG. 3 is a graph showing the exponential probability density distribution $F_x(x)$ for m=200.

For a digital Doppler system, x is typically a 12 to 16-bit integer. A plot of $f_x(x)$ versus x for m=200 is shown in FIG. 3.

The preferred auto spectrum optimization algorithm of the present invention selects an X intercept for a data compression map based on a noise threshold which is a function of the mean noise level m of the signals resulting from the FFT power spectrum function (shown as X in FIG. 1) which can be estimated using a system noise model.

The noise model assumes that the system noise originates primarily from the pre-amp in each receive channel in the beamformer 4, which is generally true for conventional all-digital systems. The pre-amp Johnson noise is often specified as a rms voltage per $HZ^{1/2}$ (e.g., 10 $nV/Hz^{1/2}$) at room temperature. Thus, knowing the signal gain and equivalent noise bandwidth of all the filters in the Doppler signal path (demodulator 6 to FFT function 12 in FIG. 1), an absolute rms noise level is computed as a function of system gain. Any quantization noise due to analog-to-digital conversion is added in an appropriate manner. Further, knowing the sample volume position and aperture strategy in the Doppler mode, the total system noise is computed by summing over all active receive channels (including array apodization effects) for a given sample volume position. Dividing this total noise level by the number of FFT points would yield the mean spectral noise power m, which completely specifies the exponential noise distribution $f_x(x)$ of Eq. (1).

Based on the calculated mean noise power m=E(x), a noise threshold in dB can be set at β=10 log (b·m), where b>0 is a constant. If b=1, the noise threshold β equals m converted to dB units. Since the standard deviation of the noise distribution is equal to its mean (Eq. 2), for b>1, β corresponds to (b−1)) standard deviations above m, converted into dB units.

Alternatively, the noise threshold β can be determined empirically by measuring noise at various system gain settings and preparing a table of values of noise versus gain.

The table can be implemented as a look up table in host computer 24 which includes one or more logic units. When the gain changes by operator manipulation of control keys 26, the value of the noise threshold changes in accordance with the look up table. Alternatively, the look up table can be implemented in hardware.

Figure 4A:
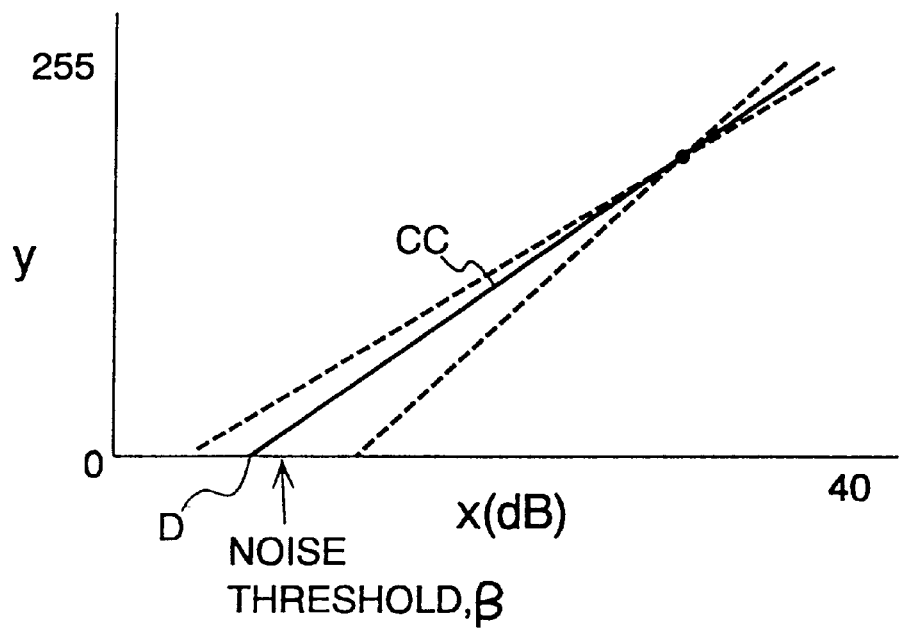
FIG. 4A is a graph showing adjustment of data compression based on mean noise level in accordance with a preferred embodiment of the invention.

Once the noise threshold $\beta$ is obtained, a compression map 14 is chosen automatically by computer 24 such that its x-intercept is closest (e.g. next lower level) to $\beta$ as shown in FIG. 4A. The value of the signals from processor 12 are mapped into y values using a compression curve CC which is discontinuous at a value D at the X axis intercept which is closest to $\beta$. The values of the processor 12 output signals below value D are stored as constant values (i.e., y=o), and the output signal values above value D are stored according to the compression curve CC. The curve CC may be linear, nonlinear or discontinuous depending on the type of compression desired. The host computer 24 can feed this optimal DR setting to the Doppler processor that performs the data compression 14 and sends the resulting data to the time line memory 22 (see FIG. 1). The dotted lines in FIG. 4A represent nonoptimal DR curves, such as those available as preset values subject to manual control in prior systems.

Figure 2A:
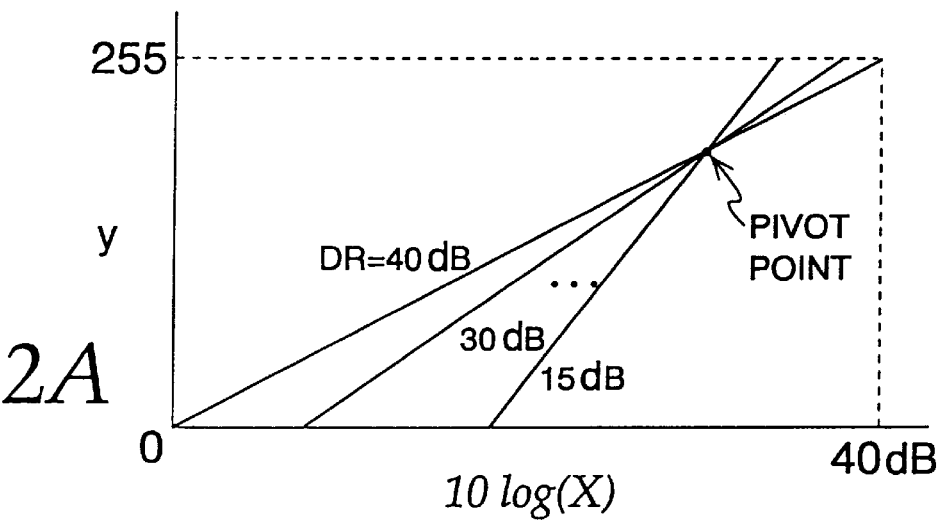
FIG. 2A is a graph showing the logarithmic compression of X (dB) to y where X is FFT power spectrum data.
Figure 2B:
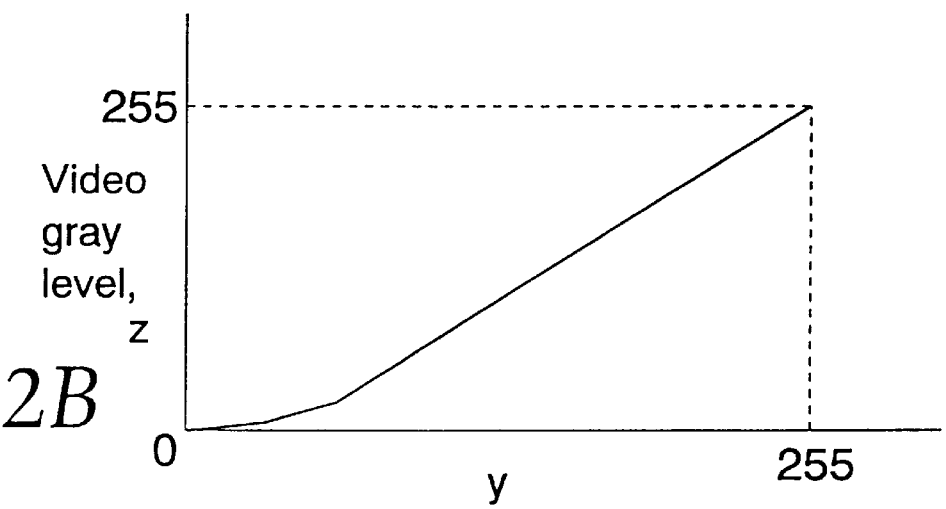
FIG. 2B is a graph showing the mapping of y to z using nonlinear gray scale mapping.

The next step is to optimize the gray scale map stored in memory 17. A recent spectral image segment (e.g. 1 sec. worth) can be extracted (dashed line in FIG. 1) from the time-line memory (TLM) 22 for y value histogram analysis. Exactly how many spectral lines should be read out depends on the time-line sweep speed. A search of the (100-$\alpha$) percentile point in the amplitude histogram is conducted. This gives, for small $\alpha$ values (e.g. 2%) the adjusted peak spectral amplitude. Using the current DR compression map (FIG. 2A), this adjusted peak y value can be converted back to dB values. Then, using the new DR compression map that is automatically selected based on the noise floor estimate (FIG. 4A), the compressed spectral peak amplitude $y_H$ for the new DR can be determined.

Figure 4B:
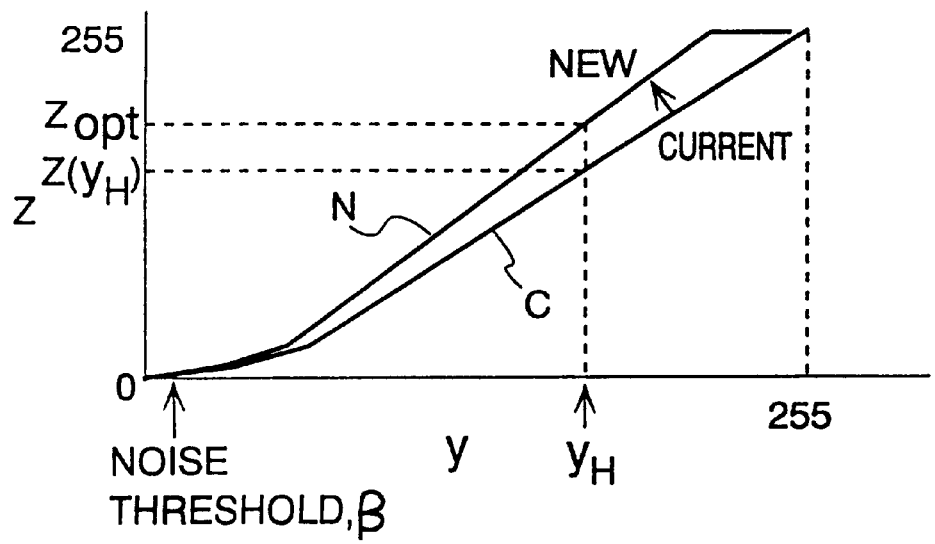
FIG. 4B is a graph showing the adjustment of gray scale mapping based on a spectral peak amplitude in accordance with a preferred embodiment of the invention.

Suppose $y_H$ maps to $z(y_H)$ according the current gray map. Since the noise threshold has already been set at or near the bottom of the gray map, to generate a new gray map as shown in FIG. 4B, the slope of the current gray map C is multiplied by a factor $Z_{opt}/z(y_H)$, such that $y_H$ maps to the optimal brightness level $z_{opt}$ for providing optimum contrast of the display. Notice that with an increased slope, the new gray map N may need to be clipped at its maximum z value (255 for an 8-bit map). In this embodiment, the spectral image appearance is enhanced by adjusting both the compression map 14 (FIG. 4A) and the gray map 17 (FIG. 4B). The above process can be activated via a single control in unit 26 and will affect the spectral display going forward in time.

Figure 5:
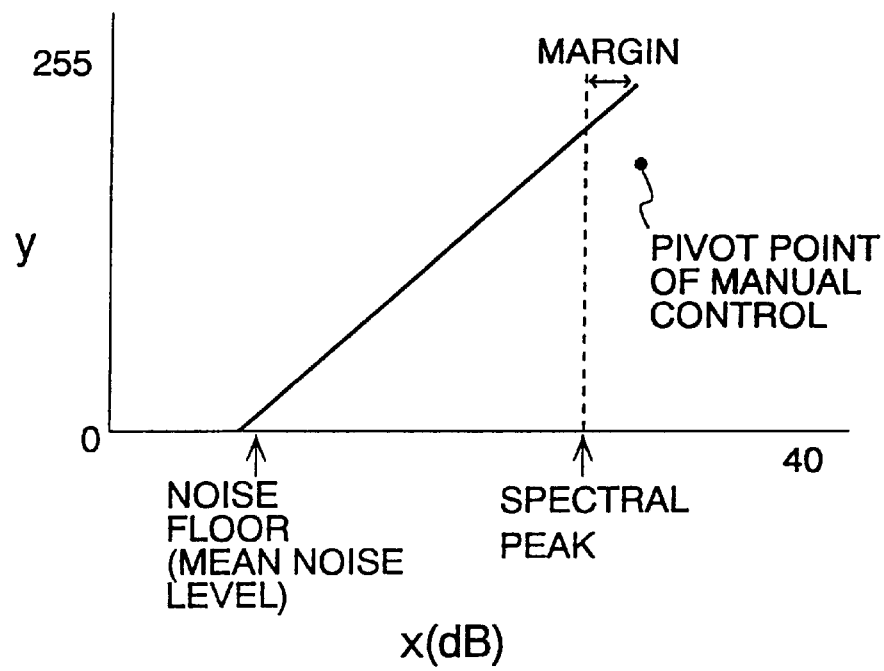
FIG. 5 is a graph showing dynamic range compression based on mean noise level and spectral amplitude in accordance with a preferred embodiment of the invention.

While the above describes the preferred auto spectrum optimization method which optimizes both the DR setting (for auto waveform tracing) and gray map, at least two other variations are possible:

1) Auto dynamic range mapping may be used alone. This method adjusts both the slope and x=intercept of the compression function to map the signal DR data (plus some margin) directly to the video display 18 DR without the need to re-scale the gray map. That is, as shown in FIG. 5, the lower and upper bounds of the compression curve are based on the actual signal DR. To determine the signal DR, the mean spectral noise floor 10log(m) can be directly computed from system gain parameters, whereas the peak amplitude is estimated by searching over all pixels in a recent spectral image segment retrieved from the time line memory 22 (dashed line in FIG. 1). According to this approach, however, the final compression map may not be one of the manually selectable maps/settings.

Figure 6:
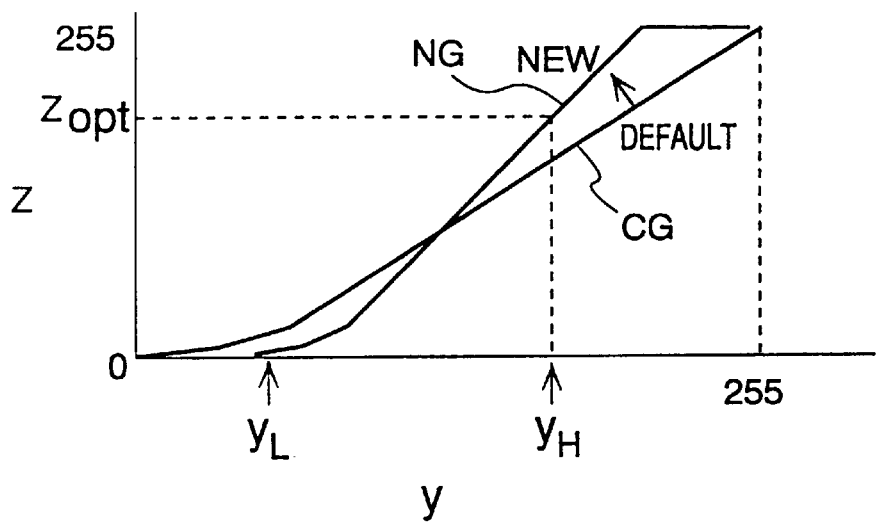
FIG. 6 is a graph showing adjustment of gray scale based on minimum and maximum spectral amplitude in accordance with a preferred embodiment of the invention.

2) Auto gray map may be used alone. It is possible to perform auto gray map alone without any auto dynamic range adjustment. First, a recent y-value spectral image segment is retrieved from time line memory 22. A search of the $\alpha$ and (100-$\alpha$) percentile points in the y-amplitude histogram of the spectral image segment is then conducted. This gives, for small $\alpha$ values (e.g. 2%) the adjusted minimum and maximum spectral amplitude, $y_L$ and $y_H$. As shown in FIG. 6, the gray map can then be re-scaled and shifted to a new gray map NG so as to window out the y-signal data range for optimal display contrast. This approach does not improve auto waveform tracing if it is done before gray mapping, and optimizes only the gray map display of the signal data within the current DR.

The foregoing preferred embodiments have been disclosed for the purpose of illustration. Variations and modifications will be readily apparent to those skilled in the art. All such variations and modifications are intended to be encompassed by the claims set forth hereinafter. For example, processing blocks 12, 14 and 20 can be combined into a single processor.

What is claimed is:

1. In an ultrasound system comprising a display unit having a plurality of brightness levels connected to display a Doppler image, apparatus for improving the appearance of the image comprising in combination:

a Doppler unit connected to generate a Doppler signal in response to an ultrasound signal backscattered from a subject being studied;

a logic unit connected to generate first signals having first values representing the magnitudes of at least some of the component frequencies of the Doppler signal and connected to generate a second signal having a second value related to a noise signal level present in the system;

a first memory connected to store third signals having third values altered from the first values according to a predetermined curve adjusted in accordance with the second value for defining the dynamic range of the third values; and a display processor connected to display the Doppler image responsive at least in part to the third signals.

2. Apparatus, as claimed in claim 1, wherein the Doppler unit comprises a continuous Doppler unit.

3. Apparatus, as claimed in claim 1, wherein the Doppler unit comprises a pulsed Doppler unit arranged so that the ultrasound signal is backscattered from a predetermined portion of the subject.

4. Apparatus, as claimed in claim 1, wherein the logic unit comprises a Fourier transform algorithm.

5. Apparatus, as claimed in claim 1, wherein the noise signal level comprises at least an estimate of a mean noise signal level.

6. Apparatus, as claimed in claim 5, wherein the mean noise signal level is based on preamplifier Johnson noise.

7. Apparatus, as claimed in claim 5, wherein the mean noise signal level is at least an estimate of the mean noise signal level in the first signals.

8. Apparatus, as claimed in claim 1, wherein the predetermined curve is discontinuous at a point determined by the second value.

9. Apparatus, as claimed in claim 1, wherein third values corresponding to first values less than the second value are substantially constant and wherein third values corresponding to first values greater than the second value are altered from the first values according to the predetermined curve.

10. Apparatus, as claimed in claim 1, wherein the logic unit is connected to generate a fourth signal having a fourth value related to one or more of the peak third values and further comprising a second memory connected to store fifth signals having fifth values altered from the third values based at least in part on the fourth value for defining the gray scale of the Doppler display and wherein the display processor is responsive at least in part to the fifth signals.

11. Apparatus, as claimed in claim 10, wherein the display processor is connected to map the fourth value to a fifth memory value related to a brightness level of the display unit resulting in enhanced contrast of the Doppler image.

12. In an ultrasound system comprising a display unit having a plurality of brightness levels for displaying a Doppler image, apparatus for improving the appearance of the image comprising in combination:

a Doppler unit connected to generate a Doppler signal based on an ultrasound signal backscattered from a subject being studied;

a logic unit connected to generate first signals having first values representing the magnitudes of at least some of the component frequencies of the Doppler signal, connected to generate second signals having second values altered from the first values according to a predetermined curve for defining the dynamic range of the second values and connected to generate a third signal having a third value related to one or more of the peak second values;

a memory connected to store fourth signals having fourth values altered from the second values based at least in part on the third value for defining the gray scale of the Doppler display; and a display processor connected to display the Doppler image responsive at least in part to the fourth signals so that the Doppler image is enhanced.

13. Apparatus, as claimed in claim 12, wherein the Doppler unit comprises a continuous Doppler unit.

14. Apparatus, as claimed in claim 12, wherein the Doppler unit comprises a pulsed Doppler unit arranged so that the ultrasound signal is backscattered from a predetermined portion of the subject.

15. Apparatus, as claimed in claim 12, wherein the logic unit comprises a Fourier transform algorithm.

16. Apparatus, as claimed in claim 12, wherein the third value is related to the estimated peak spectral amplitude of one or more of the second values.

17. Apparatus, as claimed in claim 16, wherein the third value is mapped in the memory based on a brightness level of the display unit resulting in enhanced contrast of the Doppler image.

18. In an ultrasound system comprising a display unit having a plurality of brightness levels connected to display a Doppler image, a method for improving the appearance of the image comprising the steps of:

generating a Doppler signal in response to an ultrasound signal backscattered from a subject being studied;

generating first signals having first values representing the magnitudes of at least some of the component frequencies of the Doppler signal;

generating a second signal having a second value related to a video noise signal level present in the system;

storing third signals having third values altered from the first values according to a predetermined curve adjusted in accordance with the second value for defining the dynamic range of the third values; and displaying the Doppler image based at least in part on the third signals.

19. A method, as claimed in claim 18, wherein the step of generating a Doppler signal comprises the step of generating a continuous Doppler signal.

20. A method, as claimed in claim 18, wherein the step of generating a Doppler signal comprises the step of generating a pulsed Doppler signal so that the ultrasound signal is backscattered from a predetermined portion of the subject.

21. A method, as claimed in claim 18, wherein the step of generating the first signals comprises the step of generating Fourier transform power spectrum signals.

22. A method, as claimed in claim 18, wherein the video noise signal level comprises at least an estimate of a mean noise signal level.

23. A method, as claimed in claim 22, wherein the mean video noise signal level is based on preamplifier Johnson noise.

24. A method, as claimed in claim 22, wherein the mean video noise signal level is based on a noise model of at least a portion of the system.

25. A method, as claimed in claim 18, wherein the predetermined curve is discontinuous at a point determined by the second value.

26. A method, as claimed in claim 18, wherein the third values corresponding to first values less than the second value are substantially constant and third values corresponding to first values greater than the second value are altered from the first values according to the predetermined curve.

27. A method, as claimed in claim 18, and further comprising the step of generating a fourth signal having a fourth value related to one or more of the peak third values and further comprising the step of storing fifth signals having fifth values altered from the third values based on the fourth value for defining the gray scale of the Doppler display and wherein the step of displaying the Doppler image comprises the step of displaying the Doppler image responsive at least in part to the fifth signals.

28. A method, as claimed in claim 27, wherein the step of displaying the Doppler image comprises the step of mapping the value of the fourth signal to a fifth value related to a brightness level of the display unit resulting in enhanced contrast of the Doppler image.

29. In an ultrasound system comprising a display unit having a plurality of brightness levels for displaying a Doppler image, a method for improving the appearance of the image comprising the steps of:

generating a Doppler signal based on an ultrasound signal backscattered from a subject being studied;

generating first signals having first values representing the magnitudes of at least some of the component frequencies of the Doppler signal;

storing second signals with second values altered from the first values according to a predetermined curve for defining the dynamic range of the second values;

generating a third signal having a third value related to one or more of the peak second values;

storing fourth signals having fourth values altered from the second values based on the third value for defining the gray scale of the Doppler display; and displaying the Doppler image responsive at least in part to the fourth signals so that the Doppler image is enhanced.

30. A method, as claimed in claim 29, wherein the step of generating a Doppler signal comprises the step of generating a continuous Doppler signal.

31. A method, as claimed in claim 29, wherein the step of generating a Doppler signal comprises the step of generating a pulsed Doppler signal so that the ultrasound signal is backscattered from a predetermined portion of the subject.

32. A method, as claimed in claim 29, wherein the step of generating the first signals comprises the step of generating Fourier transform power spectrum signals.

33. A method, as claimed in claim 29, wherein the third value is related to the estimated peak spectral amplitude of one or more of the second values.

34. A method, as claimed in claim 33, wherein the step of storing the fourth values comprises the step of mapping the second values based at least in part on a brightness level of the display unit resulting in enhanced contrast of the Doppler image.

* * * * *